United States Patent
Oogose et al.

(10) Patent No.: US 10,492,482 B2
(45) Date of Patent: Dec. 3, 2019

(54) DUAL-BEARING REEL

(71) Applicant: Shimano Inc., Sakai, Osaka (JP)

(72) Inventors: Hiroki Oogose, Sakai (JP); Akira Niitsuma, Sakai (JP)

(73) Assignee: SHIMANO INC., Sakai, Osaka (JP)

( * ) Notice: Subject to any disclaimer, the term of this patent is extended or adjusted under 35 U.S.C. 154(b) by 0 days.

(21) Appl. No.: 16/037,743

(22) Filed: Jul. 17, 2018

(65) Prior Publication Data
US 2019/0045766 A1 Feb. 14, 2019

(30) Foreign Application Priority Data
Aug. 8, 2017 (JP) .................................. 2017-153207

(51) Int. Cl.
*A01K 89/01* (2006.01)
*A01K 89/015* (2006.01)
*A01K 89/00* (2006.01)

(52) U.S. Cl.
CPC ........ *A01K 89/0193* (2015.05); *A01K 89/006* (2013.01); *A01K 89/01921* (2015.05)

(58) Field of Classification Search
CPC ...................... A01K 89/0192; A01K 89/01912
See application file for complete search history.

(56) References Cited

U.S. PATENT DOCUMENTS

| | | | | |
|---|---|---|---|---|
| 5,377,925 | A * | 1/1995 | Miyazaki | A01K 89/01921 242/312 |
| 8,517,298 | B1 * | 8/2013 | Benson | A01K 89/015 242/255 |
| 2004/0144877 | A1 * | 7/2004 | Kawasaki | A01K 89/01557 242/278 |
| 2007/0181728 | A1 * | 8/2007 | Kawasaki | A01K 89/00 242/310 |
| 2011/0057063 | A1 * | 3/2011 | Kawasaki | A01K 89/0192 242/283 |
| 2012/0056028 | A1 * | 3/2012 | Kawasaki | A01K 89/006 242/267 |
| 2013/0087647 | A1 * | 4/2013 | Niitsuma | A01K 89/0192 242/223 |
| 2015/0327527 | A1 * | 11/2015 | Ikebukuro | A01K 89/0192 242/264 |
| 2017/0303520 | A1 * | 10/2017 | Hyun | A01K 89/01903 |

FOREIGN PATENT DOCUMENTS

JP 2919741 B2 7/1999

* cited by examiner

*Primary Examiner* — Emmanuel M Marcelo
(74) *Attorney, Agent, or Firm* — United IP Counselors, LLC (57) ABSTRACT

A frame has a first side plate, a second side plate, a level winding guard, and a mounting portion. The first side plate, the second side plate, the level winding guard, and the mounting portion are formed of a single member. The first side plate has a thick portion and a through hole. The thick portion is formed in front of a spool on an inside surface of the first side plate. The through hole penetrates the thick portion in an axial direction. In addition, the through hole has an inner diameter larger than an outer diameter of the guide member.

10 Claims, 8 Drawing Sheets

DUAL-BEARING REEL

CROSS-REFERENCE TO RELATED APPLICATIONS

This application claims priority to Japanese Patent Application No. 2017-153207, filed on Aug. 8, 2017, the entirety of which is hereby incorporated by reference in its entirety.

BACKGROUND

Technical Field

The present disclosure relates to a dual-bearing reel.

Background Information

Dual-bearing reels generally have a reel main body, a spool, and a level winding mechanism. The spool is supported on the reel main body in a rotatable manner. The level winding mechanism is a mechanism for moving a fishing line in the axial direction in such a manner that the fishing line is wound evenly on the spool.

The frame of the reel main body of the dual-bearing reel disclosed in Japanese Patent Application No. 2919741 is formed of a single member. This frame has a first side plate, a second side plate, a level winding guard, a thumb rest, and a mounting portion. The inside of the first side plate has a thick portion that covers an outer peripheral surface of a flange portion of the spool.

BRIEF SUMMARY

When a mold is used to produce the aforementioned frame formed of a single member, the mold needs to be removed from the lower side of the frame. For this reason, the thick portion of the first side plate is formed so as to stretch in the vertical direction at the front side of the spool. The level winding mechanism is disposed in front of the thick portion so that a sliding member does not interfere with the thick portion. Downsizing of the dual-bearing reel of such configuration in the front-rear direction is desired.

It is an object of the present disclosure to downsize the dual-bearing reel.

A dual-bearing reel according to an aspect of the present disclosure is mounted on a fishing rod and configured to pull out a fishing line forward. This dual-bearing reel is provided with a reel main body, a spool, and a level winding mechanism. The reel main body includes a frame. The spool is supported on the reel main body. The level winding mechanism has a cylindrical guide and a slider. The guide extends in front of the spool in an axial direction. The slider slides along the guide. The frame has a first side plate, a second side plate, a level winding guard, and a mounting portion. The second side plate is spaced apart from the first side plate in the axial direction. The level winding guard connects between the first side plate and the second side plate. The level winding guard is disposed in front of the level winding mechanism. The mounting portion connects between the first side plate and the second side plate. The mounting portion is also configured to be mounted on the fishing rod. The first side plate, the second side plate, the level winding guard, and the mounting portion are formed of a single member. The first side plate has a thick portion and a through hole. The thick portion is formed in front of the spool on an inside surface of the first side plate. The through hole penetrates the thick portion in the axial direction. In addition, the through hole has an inner diameter larger than the outer diameter of the guide.

According to this configuration, the inner diameter of the through hole penetrating the thick portion is larger than the outer diameter of the guide. This through hole enables a part of the slider to avoid interference with the thick portion. This eliminates the need for the level winding mechanism to be installed in front of the thick portion, thereby achieving downsizing of the dual-bearing reel in the front-rear direction.

It is preferable that the through hole be formed past a front edge of the thick portion.

It is preferable that the slider not overlap with the thick portion in an axial view.

It is preferable that the guide be disposed coaxially with the through hole.

It is preferable that the dual-bearing reel further have a thumb rest. The thumb rest connects between the first side plate and the second side plate. The thumb rest is disposed above the level winding mechanism. The thumb rest is formed of a single member along with the first side plate, the second side plate, the level winding guard, and the mounting portion.

The present disclosure can achieve downsizing of the dual-bearing reel.

DETAILED DESCRIPTION OF EMBODIMENTS

A preferred embodiment of the dual-bearing reel according to the present disclosure is described hereinafter with reference to the drawings. Note that in the following descriptions, the axial direction means a direction in which a rotating shaft of a spool extends. In addition, a direction in which a fishing line is pulled out indicates the front side of the dual-bearing reel and the opposite side indicates the rear side of the reel. With the dual-bearing reel mounted on a fishing rod, the direction toward the fishing rod is the lower side, and the direction away from the fishing rod is the upper side.

Figure 1:
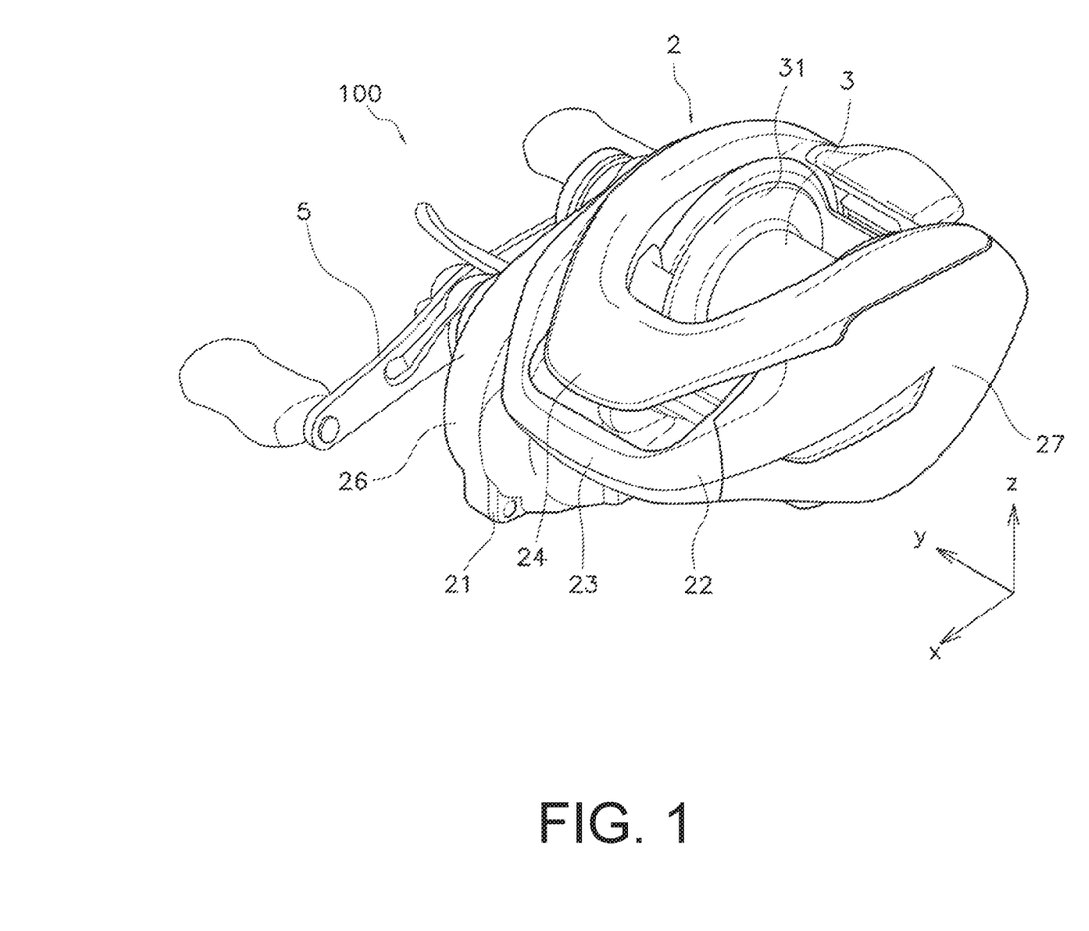
FIG. 1 is a perspective view of a dual-bearing reel.

As shown in FIG. 1, a dual-bearing reel 100 has a reel main body 2, a spool 3, a level winding mechanism 4 (see FIG. 5), and a handle 5.

[Reel Main Body]

Figure 2:
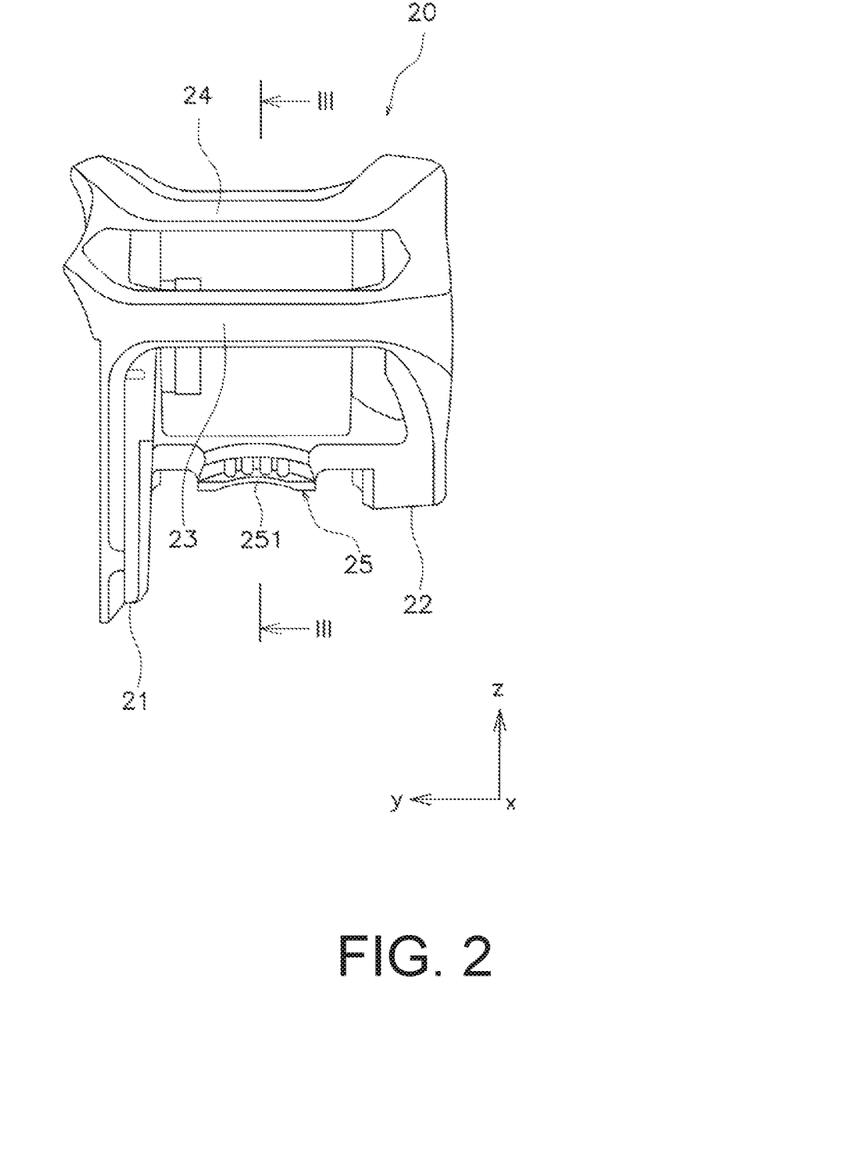
FIG. 2 is a front view of a frame.

As shown in FIG. 2, the reel main body 2 has a frame 20. The frame 20 has a first side plate 21, a second side plate 22, a level winding guard 23, a thumb rest 24, and a mounting portion 25. The first side plate 21, the second side plate 22, the level winding guard 23, the thumb rest 24, and the mounting portion 25 are formed integrally of a single member. Specifically, the frame 20 is formed integrally using a mold.

The first side plate 21 and the second side plate 22 are spaced apart from each other in the axial direction (y-axis direction). The level winding guard 23 extends in the axial direction and connects between the first side plate 21 and the second side plate 22. The level winding guard 23 is also disposed in front of the level winding mechanism 4.

The thumb rest 24 extends in the axial direction and connects between the first side plate 21 and the second side plate 22. Also, the thumb rest 24 is disposed above the level winding guard 23. The fishing line is pulled out from between this thumb rest 24 and the level winding guard 23. The thumb rest 24 is configured to allow a thumb of an angler to be placed thereon.

The mounting portion 25 extends in the axial direction and connects between the first side plate 21 and the second side plate 22. The mounting portion 25 is configured to be mounted onto a fishing rod and extends in a front-rear direction (x-axis direction). Thus, the mounting portion 25 is an example of a means for mounting the dual-bearing reel on a fishing rod. The mounting portion 25 has a mounting surface 251. This mounting surface 251 faces the fishing rod when the dual-bearing reel 100 is mounted on the fishing rod. In other words, the mounting surface 251 faces downward.

As shown in FIG. 1, a first side cover 26 is attached to the first side plate 21. Furthermore, a second side cover 27 is attached to the second side plate 22. A rotation transmission mechanism (not shown) that is configured to transmit the rotation of the handle 5 to the spool 3 and the level winding mechanism 4, and the like are housed in a housing space defined by the first side plate 21 and the first side cover 26.

Figure 3:
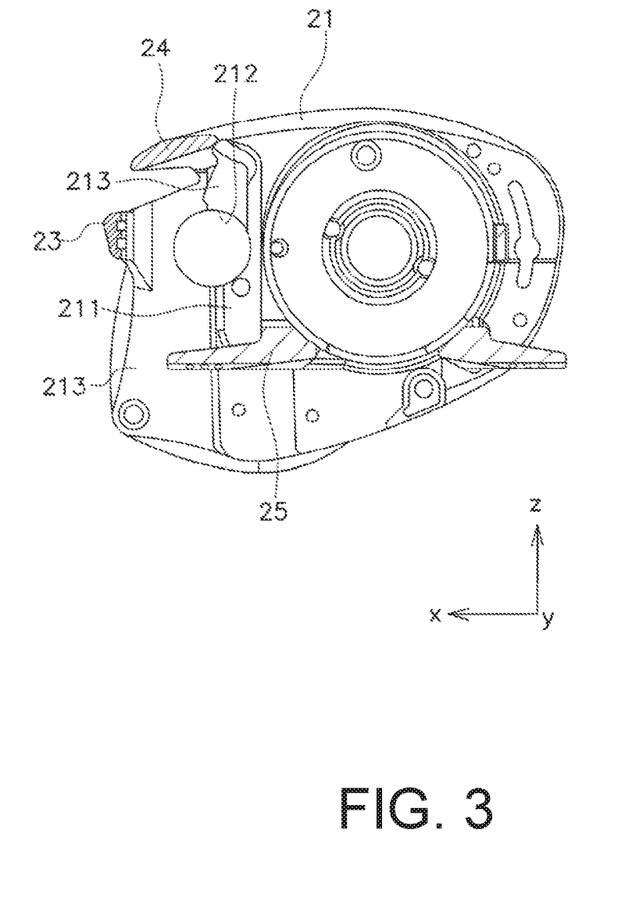
FIG. 3 is a cross-sectional view taken along line of FIG. 2.
Figure 4:
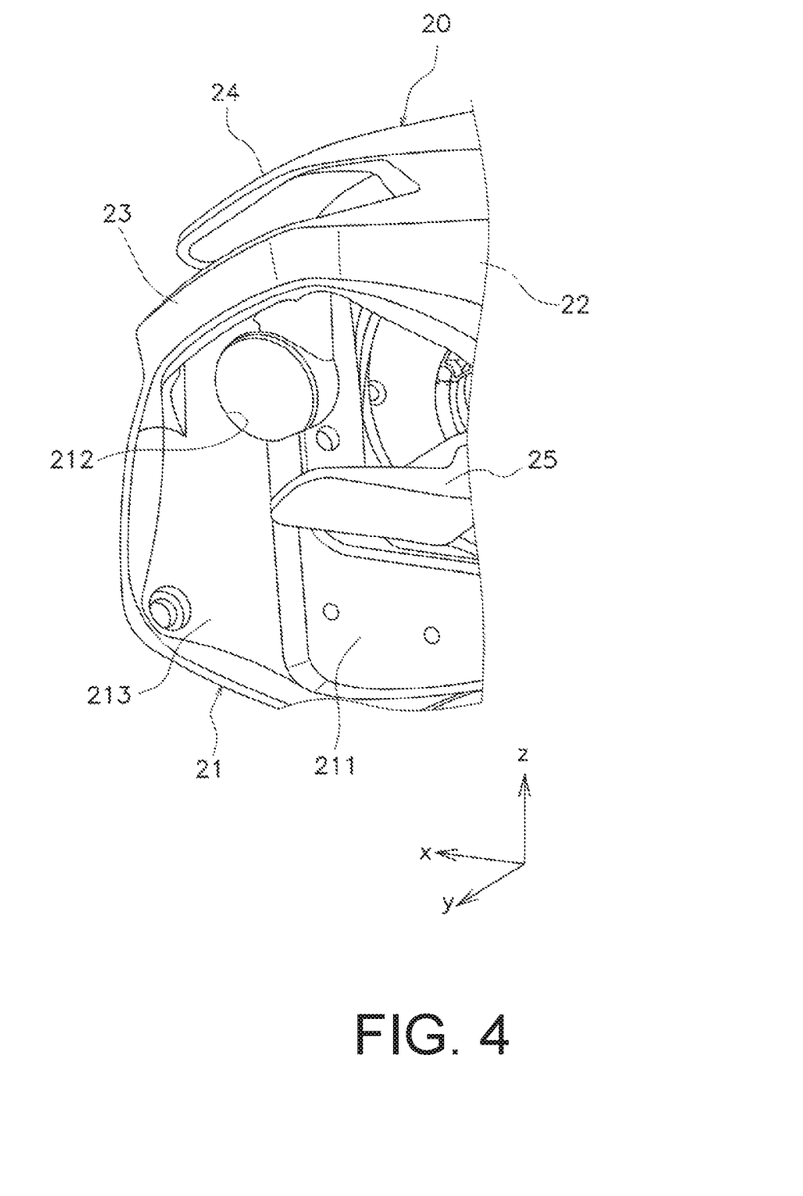
FIG. 4 is an enlarged perspective view of the frame.

As shown in FIGS. 3 and 4, the first side plate 21 has a thick portion 211 on the inside surface thereof. Note that the inside surface of the first side plate 21 faces the second side plate 22 side. The thick portion 211 is located in front of the spool 3. The thick portion 211 extends along an outer peripheral surface of a flange 31 of the spool 3 and extends in a vertical direction (z-axis direction) as well. Note that a thin portion 213 that is thinner than the thick portion 211 is formed in front of the thick portion 211. The boundary between the thick portion 211 and the thin portion 213 extends in the vertical direction.

The first side plate 21 has a through hole 212. This through hole 212 penetrates the thick portion 211 in the axial direction. The inner diameter of the through hole 212 is larger than the outer diameter of a guide 42 of the level winding mechanism 4, which is described hereinafter. Moreover, the inner diameter of the through hole 212 is larger than the outer diameter of a sliding portion 431 of a slider 43 of the level winding mechanism 4. For example, the inner diameter of the through hole 212 is approximately 11 to 13 mm.

The through hole 212 is formed past a leading edge of the thick portion 211. In other words, the through hole 212 is formed across the thick portion 211 and the thin portion 213. Because a part of the thick portion 211 above the through hole 212 is trimmed, the thin portion 213 constitutes this part above the through hole 212.

[Spool]

As shown in FIG. 1, the spool 3 is supported on the reel main body 2 in a rotatable manner. Specifically, the spool 3 is disposed between the first side plate 21 and the second side plate 22. The spool 3 is also attached to a spool shaft (not shown) that is supported on the reel main body 2 in a rotatable manner. The outer peripheral surface of the flange 31 of the spool 3 is covered by the thick portion 211 as described above.

[Level Winding Mechanism]

Figure 5:
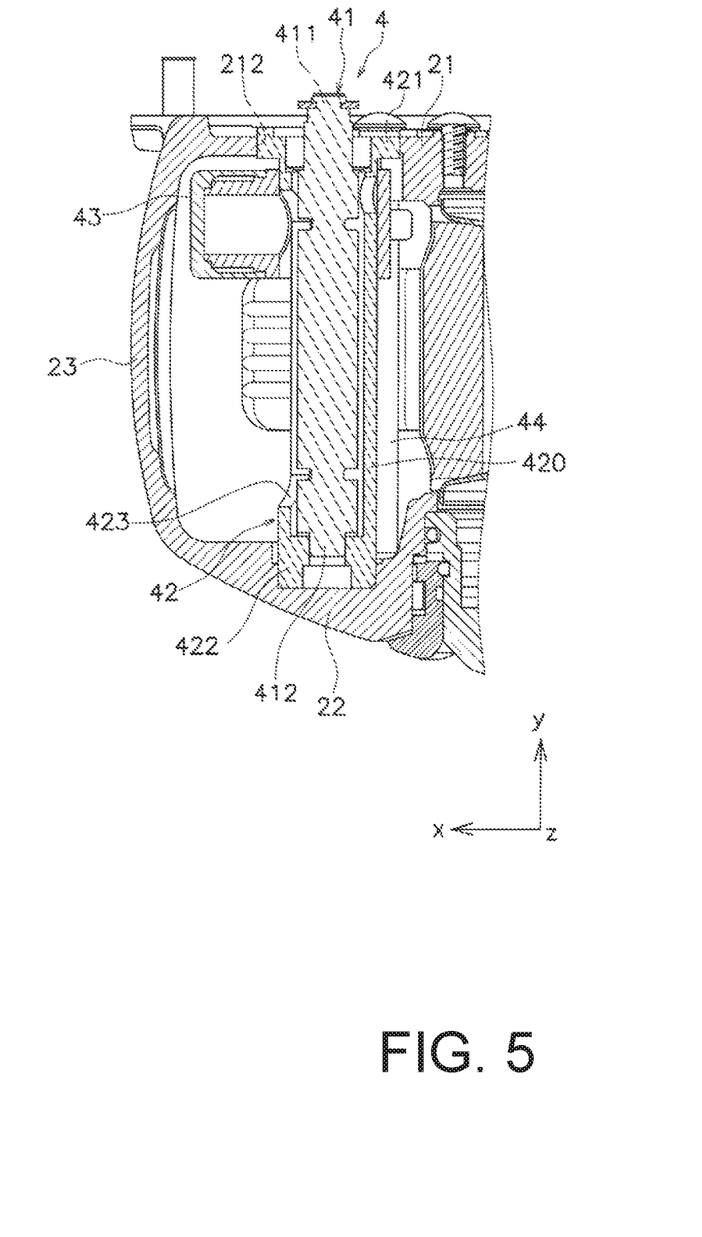
FIG. 5 is a cross-sectional view of the dual-bearing reel.

As shown in FIG. 5, the level winding mechanism 4 is a mechanism that reciprocates in order to evenly wind the fishing line on the spool 3. Thus, the level winding mechanism 4 is an example of a means for evenly winding the fishing line on the spool 3. The level winding mechanism 4 has a worm shaft 41, the guide 42, and the slider 43.

The worm shaft 41 is formed in a cylindrical shape and has a spiral groove on an outer peripheral surface thereof. The worm shaft 41 extends in the axial direction. The worm shaft 41 also extends between the first side plate 21 and the second side plate 22.

First and second end portions 411, 412 of the worm shaft 41 are supported on the guide 42 in a rotatable manner. The first end portion 411 of the worm shaft 41 is located in the housing space between the first side plate 21 and the first side cover 26. A gear (not shown), a part of the rotation transmission mechanism, is mounted on the first end portion 411 of this worm shaft 41. The rotation of the handle 5 is transmitted to the worm shaft 41 via the rotation transmission mechanism.

Figure 6:
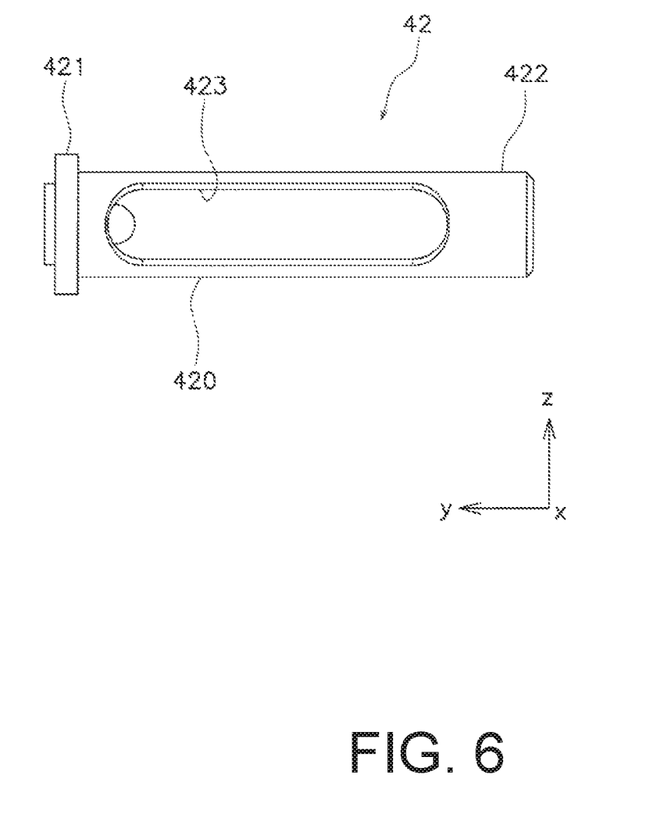
FIG. 6 is a front view of a guide.

As shown in FIG. 6, the guide 42 is a member for guiding the slider 43. Thus, the guide 42 is an example of a means for guiding the slide 43. The guide 42 is formed in a cylindrical shape. The guide 42 has a guide main body portion 420, a first end portion 421, and a second end portion 422. The guide main body portion 420 is where the slider 43 slides.

The guide 42 has an opening 423. The opening 423 is open toward the front side. The opening 423 extends in the axial direction. The slider 43 is engaged with the worm shaft 41 via this opening 423.

The outer diameter of the guide 42 is smaller than the inner diameter of the through hole 212 of the first side plate 21. The outer diameter of the guide 42 is, for example, approximately 7 to 9 mm. It is preferable that the difference between the outer diameter of the guide 42 and the inner diameter of the through hole 212 be approximately 3 to 5 mm. Note that the outer diameter of the guide 42 means the outer diameter of the guide main body portion 420. In other words, the outer diameter of the guide main body portion 420 of the guide 42 is smaller than the diameter of the through hole 212. Note that the outer diameter of the first end portion 421 of the guide 42 is larger than the outer diameter of the guide main body portion 420.

As shown in FIG. 5, the outer diameter of the first end portion 421 of the guide 42 is approximately equal to the inner diameter of the through hole 212 of the first side plate 21. The first end portion 421 of the guide 42 is fitted into the through hole 212 so as to close the through hole 212.

The first end portion 421 of the guide 42 is supported on the first side plate 21 in a non-rotatable manner. The second end portion 422 of the guide 42 is supported on the second side plate 22 in a non-rotatable manner. The guide 42 extends in the axial direction at the front side of the spool 3. The worm shaft 41 extends inside this guide 42. That is, the guide 42 is disposed radially outside the worm shaft 41.

Figure 7:
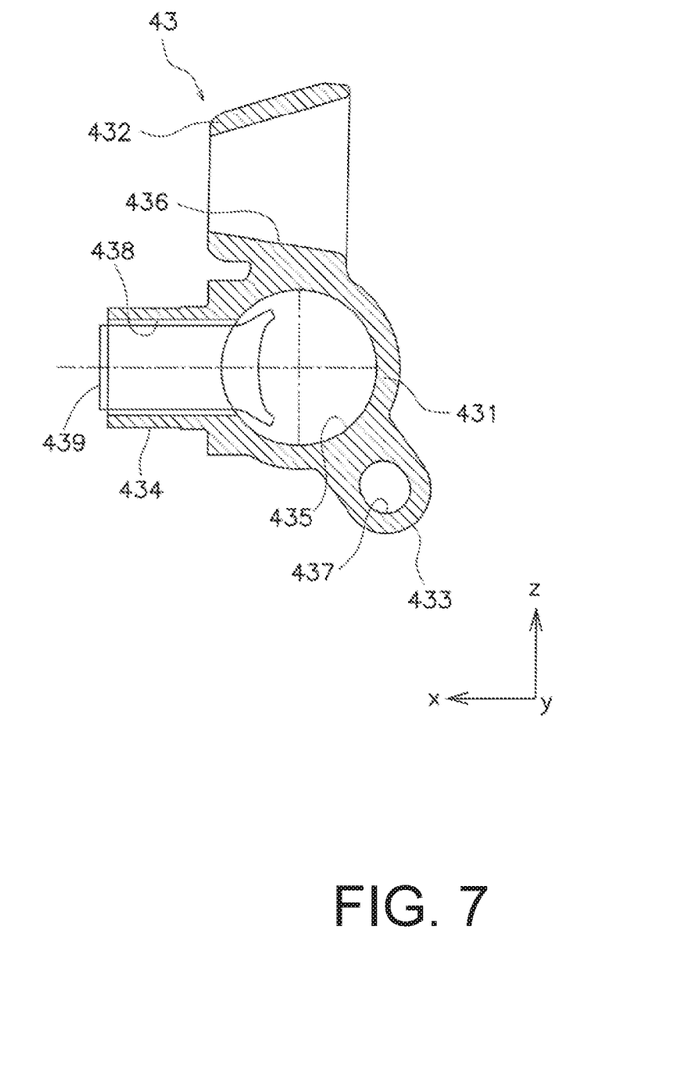
FIG. 7 is a cross-sectional view of a slider.

As shown in FIG. 7, the slider 43 is configured to slide along the guide 42. Thus, the slider 43 is an example of a means for sliding along the guide 42. Specifically, the slider 43 reciprocates in the axial direction along the guide main body portion 420 of the guide 42. The slider 43 has the sliding portion 431, a fishing line guide portion 432, a support portion 433, and a cylindrical portion 434. The sliding portion 431, the fishing line guide portion 432, the support portion 433, and the cylindrical portion 434 are formed integrally of a single member.

The sliding portion 431 is a part that slides along the guide 42. The sliding portion 431 has a through hole 435. The through hole 435 is open in the axial direction. The sliding portion 431 is a cylindrical part that extends substantially in the axial direction. The guide 42 penetrates through the through hole 435. The inner diameter of the through hole 435 is substantially equal to the outer diameter of the guide main body portion 420 of the guide 42. Also, the outer diameter of the sliding portion 431 is smaller than the inner diameter of the through hole 212 formed in the first side plate 21. Therefore, the interference between the sliding portion 431 and the thick portion 211 can be avoided.

The fishing line guide portion 432 is disposed above the sliding portion 431. The fishing line guide portion 432 has a through hole 436 that is open in the front-rear direction. The inner diameter of the through hole 436 gradually tapers toward the front side. The fishing line extends inside this through hole 436.

The support portion 433 extends downward and rearward from the sliding portion 431. This support portion 433 has a through hole 437. The through hole 437 is open in the axial direction. A support rod 44 (see FIG. 5) extending in the axial direction between the first side plate 21 and the second side plate 22 penetrates through the through hole 437.

The cylindrical portion 434 extends from the sliding portion 431 to the front side. The cylindrical portion 434 has a through hole 438. One of the opening surfaces of this through hole 438 is open toward the front side, and the other opening surface is open into the through hole 435 of the sliding portion 431. An engaging portion 439 is disposed inside the through hole 438 of this cylindrical portion 434. The engaging portion 439 is engaged with the spiral groove of the worm shaft 41. Therefore, the slider 43 is caused to reciprocate in the axial direction by the rotation of the worm shaft 41.

Figure 8:
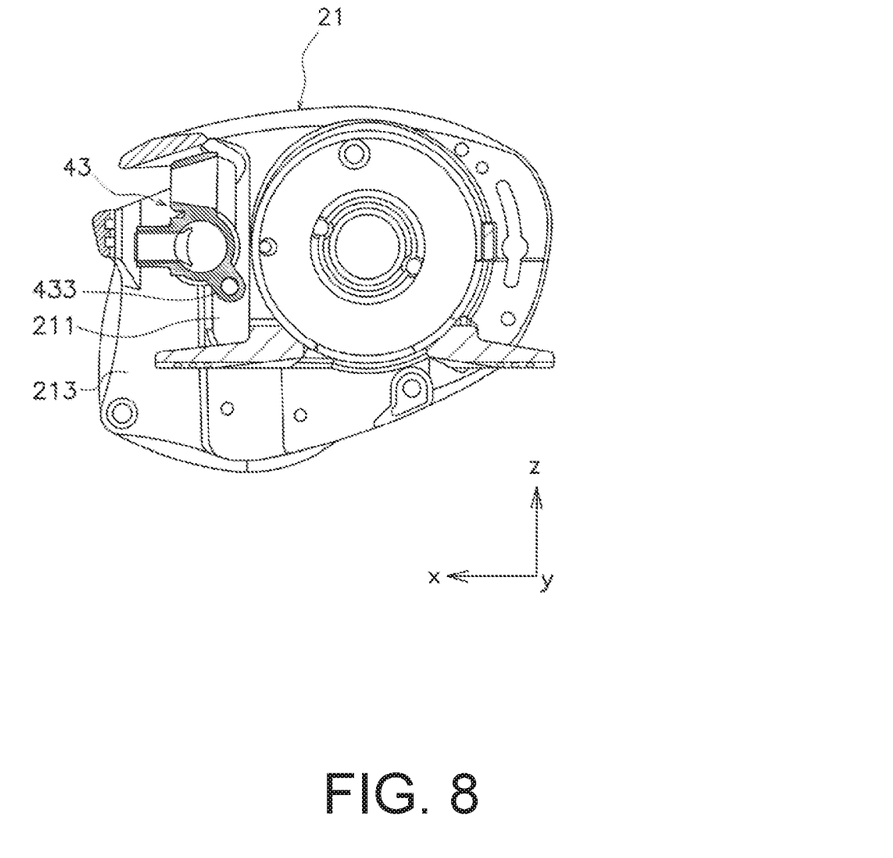
FIG. 8 is a side sectional view showing the relationship between the frame and the slider.

As shown in FIG. 8, the slider 43 does not overlap with the thick portion 211 of the first side plate 21 in the axial view (when viewed in the y-axis direction). Specifically, an end surface of the slider 43 at the first side plate 21 side does not overlap with the thick portion 211 in the axial view. Such a configuration prevents the slider 43 from interfering with the thick portion 211 even when the slider 43 reciprocates in the axial direction. Note that the support portion 433 extends from the center of the sliding portion 431 in the axial direction and does not constitute the end surface of the slider 43 at the first side plate 21 side. Consequently, the support portion 433 overlaps with the thick portion 211 in the axial view but does not interfere with the thick portion 211 when the slider 43 slides.

Modification

Though the above has described the preferred embodiment of the present disclosure, the present disclosure is not limited thereto. Various changes can be made to the present advancement without departing from the gist of the present disclosure.

(a) The frame 20 does not have to include the thumb rest 24. Alternatively, the thumb rest 24 can be a separate member from the first side plate 21, the second side plate 22, the level winding guard 23, and the mounting portion 25.

(b) In the foregoing embodiment, the first end portion 421 of the guide 42 is formed to have a diameter larger than the guide main body portion 420 and fitted into the through hole 212; however, the present disclosure is not limited to this configuration. For example, the first end portion 421 and the second end portion 422 of the guide 42 can be formed to have substantially the same diameter, and a collar member can be fitted into a gap between an outer peripheral surface of the first end portion 421 of the guide 42 and an inner peripheral surface of the through hole 212. In addition, the guide 42 and the through hole 212 can be disposed so as to be eccentric to each other.

EXPLANATION OF REFERENCE NUMERALS

2 Reel main body
20 Frame
21 First side plate
22 Second side plate
23 Level winding guard
24 Thumb rest
3 Spool
4 Level winding mechanism
42 Guide
43 Slider

What is claimed is:

1. A dual-bearing reel configured to be mounted on a fishing rod and pull out a fishing line forward, the dual-bearing reel comprising:
    a reel main body including a frame;
    a spool having a flange, the spool supported on the reel main body; and
    a level winding mechanism having a cylindrical guide extending in front of the spool in an axial direction of the spool, and a slider that slides along the guide,
    the frame having
        a first side plate,
        a second side plate spaced apart from the first side plate in the axial direction,
        a level winding guard that connects between the first side plate and the second side plate and is disposed in front of the level winding mechanism, and
        a mounting portion that connects between the first side plate and the second side plate and is configured to be mounted on the fishing rod,
        the first side plate, the second side plate, the level winding guard, and the mounting portion formed of a single member,
    the first side plate having a thick portion formed in front of the spool on an inside surface of the first side plate, and a through hole penetrating the thick portion in the axial direction and having an inner diameter larger than an outer diameter of the guide, the guide disposed inside the through hole, and
    the thick portion extending along an outer periphery of the flange of the spool and in a vertical direction perpendicular to the axial direction.

2. The dual-bearing reel according to claim 1, wherein the through hole is formed past a front edge of the thick portion.

3. The dual-bearing reel according to claim 1, wherein the slider does not overlap with the thick portion in an axial view.

4. The dual-bearing reel according to claim 1, wherein the guide is disposed coaxially with the through hole.

5. The dual-bearing reel according to claim 1, further comprising:
    a thumb rest that connects between the first side plate and the second side plate and is disposed above the level winding mechanism,
    the thumb rest formed of the single member along with the first side plate, the second side plate, the level winding guard, and the mounting portion.

6. A dual-bearing reel configured to pull out a fishing line forward, the dual-bearing reel comprising:
    a reel main body including a frame;
    a spool having a flange, the spool supported on the reel main body; and
    means for evenly winding the fishing line on the spool, the means for evenly winding having a guide extending in front of the spool in an axial direction of the spool, and means for sliding along the guide, the frame having a first side plate, a second side plate spaced apart from the first side plate in the axial direction, a level winding guard that connects between the first side plate and the second side plate and is disposed in front of the means for evenly winding, and means for mounting the dual-bearing reel on a fishing rod, the means for mounting connecting between the first side plate and the second side plate, the first side plate, the second side plate, the level winding guard, and the means for mounting formed of a single member, the first side plate having a thick portion formed in front of the spool on an inside surface of the first side plate, and a through hole penetrating the thick portion in the axial direction and having an inner diameter larger than an outer diameter of the guide, the guide disposed inside the through hole, and the thick portion extending along an outer periphery of the flange of the spool and in a vertical direction perpendicular to the axial direction.

7. The dual-bearing reel according to claim 6, wherein the through hole is formed past a front edge of the thick portion.

8. The dual-bearing reel according to claim 6, wherein the means for sliding does not overlap with the thick portion in an axial view.

9. The dual-bearing reel according to claim 6, wherein the guide is disposed coaxially with the through hole.

10. The dual-bearing reel according to claim 6, further comprising:

a thumb rest that connects between the first side plate and the second side plate and is disposed above the means for evenly winding, the thumb rest formed of the single member along with the first side plate, the second side plate, the level winding guard, and the means for mounting.

* * * * *